June 25, 1968     K. J. CLEEREMAN ET AL     3,389,434

MECHANICAL SEAL FOR USE IN MOLDING APPARATUS

Filed Sept. 20, 1966     2 Sheets-Sheet 1

INVENTORS.
KENNETH J. CLEEREMAN
BY EDWARD R. SEDERLUND

Dominik, Stein & Knechtel

ATTYS.

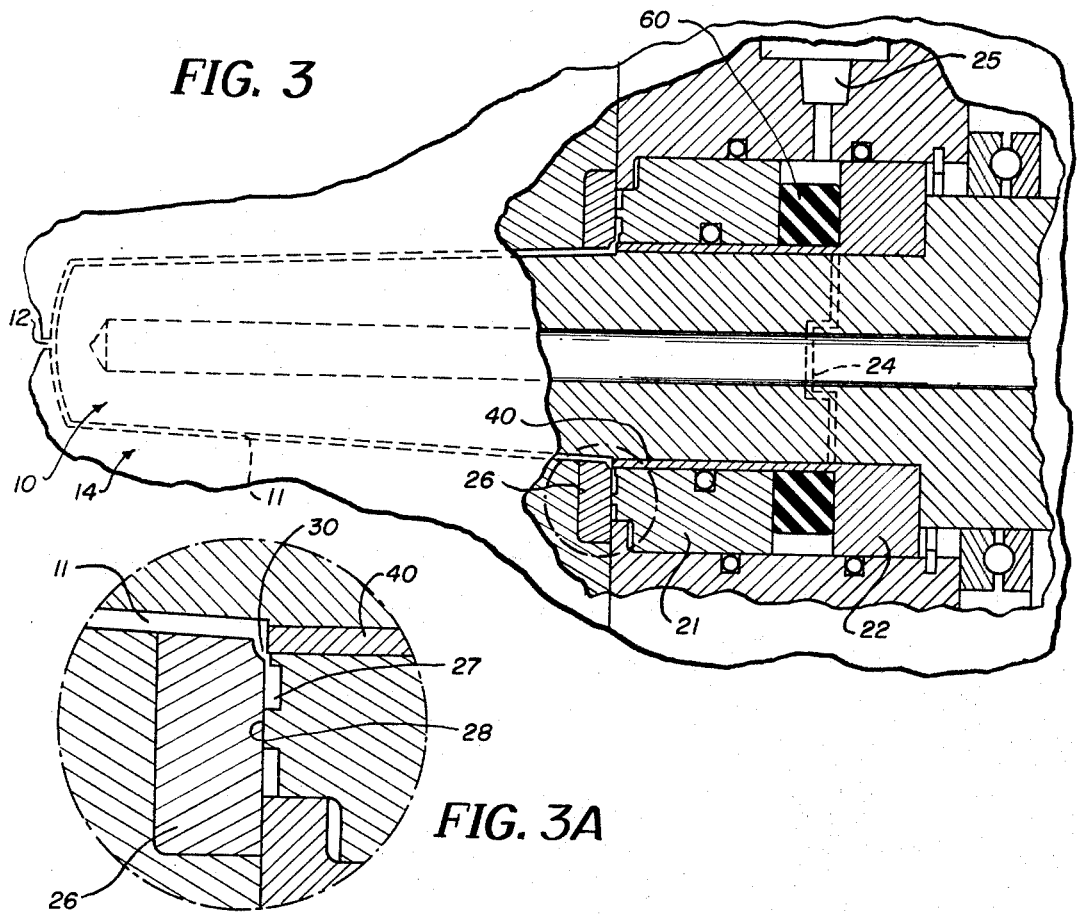
FIG. 3
FIG. 3A
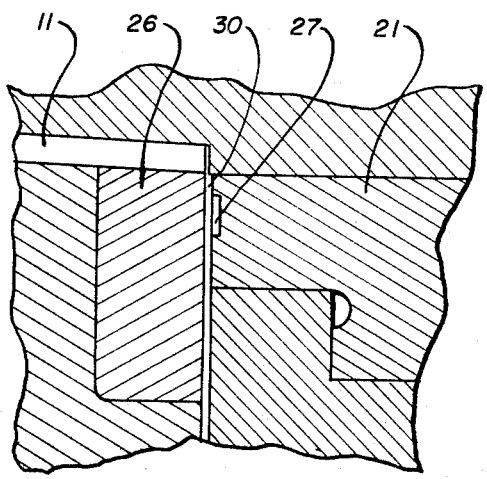
FIG. 4
INVENTORS.
KENNETH J. CLEEREMAN
BY EDWARD R. SEDERLUND
ATTYS.

United States Patent Office 3,389,434
Patented June 25, 1968

3,389,434
MECHANICAL SEAL FOR USE IN MOLDING
APPARATUS
Kenneth J. Cleereman, Midland, and Edward R. Seder-
lund, Saginaw, Mich., assignors to The Dow Chemical
Company, Midland, Mich., a corporation of Delaware
Continuation-in-part of application Ser. No. 501,713,
Oct. 22, 1965. This application Sept. 20, 1966, Ser.
No. 580,697
11 Claims. (Cl. 18—42)

ABSTRACT OF THE DISCLOSURE

In plastic molding apparatus wherein one mold element rotates, a mechanical seal comprising a rotating seal element and a stationary seal element, the seal being separated from the mold cavity by a reservoir and an annular gap leading into said reservoir.

---

This application is a continuation-in-part of United States patent application, Ser. No. 501,713, filed Oct. 22, 1965.

This invention relates to mechanical seals and more particularly to mechanical seals for molding apparatus wherein at least one mold element is rotated or oscillated during the molding operation to impart orientation to the molecules of the plastic being molded.

In ordinary injection molding processes, a molten plastic is introduced into the cavity at high pressures and speeds. Usually moving elements of the mold are stationary during injection so that all seals are static seals. The mold is generally held shut by the use of a clamping force on the mold which is higher than the force exerted by the plastic during the injecting cycle. Elements such as knockout pins which move only when the plastic is solidified are no problem to seal. In such case, a precision fit with a minimum sliding tolerance will stop polymer flow and no flash is encountered.

An entirely different situation exists, however, when one of the mold elements is rotated or oscillated such as in the very recent development wherein orientation is imparted to the molecules. The normal minimum tolerances, which permit rotation or oscillation causes flow of the plastic into the seal. This appears to be caused by a reduction in viscosity of the polymer.

Journal bearings are not generally satisfactory because the molten plastic flashes into the bearing seal. The bearing must then be cleaned out between each cycle. In a production operation, this would be intolerable.

In the above identified patent application, there is disclosed an improved seal for molding plastic wherein rotation or oscillation of one of the mold elements is used. With the disclosed seal, a deposit is frequently left on the seal face and has to be removed. The frequency at which this deposit occurs depends largely upon how long the mold is rotated after the fill point during each cycle. With small amounts of rotation, less than one revolution, little contamination is encountered. If the mold is rotated several revolutions per cycle, however, considerable contamination results and the seal must be cleaned almost every cycle.

It was thought that this deposit was caused by polymer flowing into surface imperfections at the seal edges, and that with rotation the polymer was being ground up and dragged between the seal faces. Accordingly, corrective action such as improving the finish on the seal face, increasing seal pressure and changing the seal face materials was taken, however, it still failed to provide a completely satisfactory seal so that the deposit was eliminated.

The major difficulty presented by the deposit on the seal face is that it cannot be blown off but must be wiped off. Such removal is facilitated by the fact that the seal is at the parting line of the mold and, therefore presents little problem during slow molding cycles. The speeds presently being obtained with molding apparatus, however, require that the need to wipe the seal be eliminated for efficient high speed operation.

Accordingly, it is an object of the present invention to provide an improved seal for molding plastic wherein rotation or oscillation of one of the mold elements is used.

It is another object to provide a fairly simple seal for such molding.

It is still another object to provide mechanical seals in apparatus of the above described type which will hold molten plastic, hence eliminating flashing.

It is still another object to provide mechanical seals which have a relatively long life.

It is still another object to provide mechanical seals in apparatus of the above described type having means for preventing a powdery deposit from occurring at the seal face so that the need to clean the seal face is virtually eliminated.

It is still another object to provide mechanical seals which need not be continuously lubricated.

It is still another object to provide mechanical seals which are constructed in a fashion such that centering of a rotating mandrel is more easily accomplished and which, in addition, function as a stripper ring to remove the molded article from the mandrel.

Still another object is to provide mechanical seals requiring less seal face pressure than heretofore necessary in order to prevent flashing. In this respect, it is contemplated that the cost of the seals can be substantially reduced by requiring less expensive seal materials.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

A seal structure has now been devised which accomplishes the above objectives by relocating most of those parts which move relative to one another to a position in the mold apparatus removed from the molten plastic and the parts that move are mechanically sealed under pressure. More specifically, the seal structure comprises, in its broadest sense, mechanical joint elements which are held together under pressure. The interface between these elements comprises the only seal between the moving and the stationary elements of the rotating or oscillating mold apparatus which comes into contact with the plastic being molded.

The face surface of one of the seal structures has an annular orifice formed in it, and the face surface is removed to provide a narrow gap leading from the mold cavity into the annular orifice. The gap is small enough to prevent flashing, but is large enough to permit the powdery deposit which heretofore resulted on the seal face to flow into and be deposited in the annular orifice. It is also found that with this new construction, the powdery deposit, in many cases, is completely eliminated. It is further found that less seal face pressure is required, and that the seal faces, therefore, have little, if any, wear on the thrust faces thereof.

For a fuller understanding of the nature and objects of the invention, reference should be had to the following detailed description taken in connection with the accompanying drawing, in which:

FIG. 3 is a partial view of injection molding apparatus which is broken away and sectioned to illustrate a mechanical seal constructed in still another fashion;

FIG. 3a is an enlargement of the circled portion of the mechanical seal, illustrating the orifice and the gap; and FIG. 4 is an enlarged partial view of an area of the mechanical seal, illustrating an alternative method of providing the gap from the mold cavity.

Similar reference characters refer to similar parts throughout the several views of the drawing.

Figures 1, 1A:
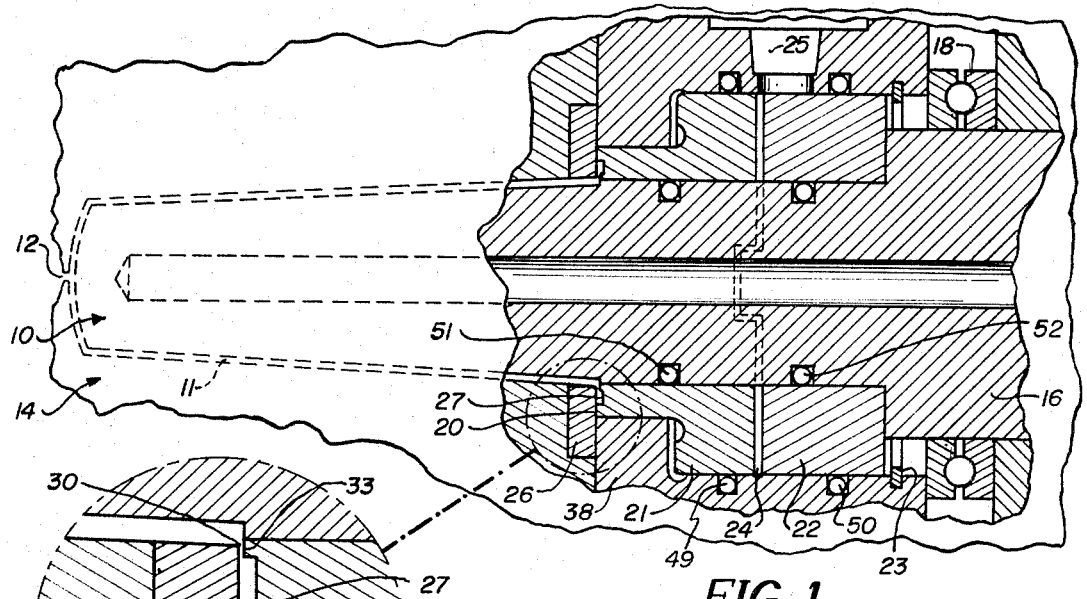
FIG. 1 is a partial broken view of injection molding apparatus illustrating a mechanical seal constructed in accordance with a first embodiment of the invention.
FIG. 1a is an enlargement of the circled portion of the mechanical seal, illustrating the orifice and the gap.
Figures 2, 2A:
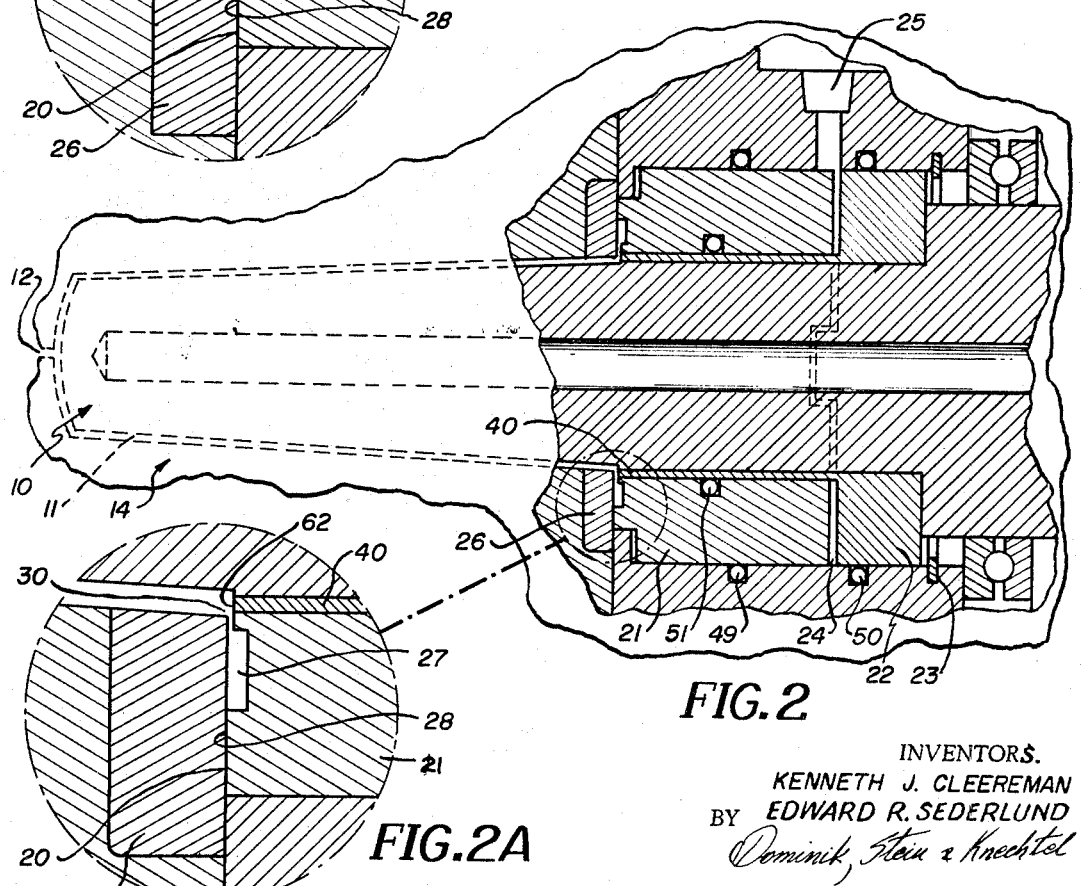
FIG. 2 is a partial, broken view of injection molding apparatus illustrating a mechanical seal constructed in accordance with a second embodiment of the invention.
FIG. 2a is an enlargement of the circled portion of the mechanical seal, illustrating the orifice and the gap.

Referring now to the drawings, FIGS. 1 to 3 illustrate various mechanical seal structures, incorporated into injection molding apparatus. With the exception of variations in the mechanical seal design described in detail below, the injection molding apparatus may be of the type generally well known in the industry and, for this reason, only that portion thereof which is necessary to explain the invention is illustrated. Also, while the description presumes that the mandrel 10 is rotated, it could as well be oscillated, or rotated and oscillated.

As is known, injection mold apparatus generally has a nozzle valve and an injection plunger, both of which individually reciprocate within an injection cylinder to supply a metered amount of fluid thermoplastic material to a mold cavity 11 defined by an outer mold element 14 and an inner mating mold element or mandrel 10.

The fluid thermoplastic is injected through orifice 12, into the mold cavity 11. Fluid plastic conveying means, such as an extruder, is generally provided to supply fluid plastic to the injection cylinder in a continuous fashion. Usually, for simplicity the outer mold element is stationary and the inner mold element is rotated. This may, however, be reversed, if desired.

Mandrel 10 comprises the forward end of a spindle 16 which is rotatably secured within a thrust bearing 18 and which has a presettable constant torque motor (not shown) drivingly coupled to its one end.

One embodiment of mechanical seal design is shown in FIG. 1. It consists of a cylindrical rotating seal member made up of rotating ring members 21 and 22, which are forced apart by means of fluid pressure, injected through an annular pressure gap 24 via inlet 25. Ring members 21 and 22 are keyed to each other and to mandrel 10.

The rotating seal is retained within a flange 38 via lock ring 23. In this embodiment, seal ring 21 also acts as a stripper means to remove the molded article from the mandrel 10, when the apparatus is opened.

O-rings 49–52 act to seal the fluid pressure adjacent gap 24.

Rotating ring 21 abuts against a stationary seal ring 26 located in the outer mold element to form a seal face 20. The mating face of ring 21 has an annular reservoir 27 formed therein and an outer diameter thereof forms a seal or thrust surface 28 which abuts against the stationary seal ring 26 so that a gap 30 into the reservoir 27 from the mold cavity 11 is provided. The gap 30 can be formed by removing, as by milling, the material of the mating face so that the gap is formed when the outer portion or thrust surface 28 abuts against the stationary seal ring 26. The width and depth of the reservoir 27 can vary between wide limits and only need be of a size to collect therein any powdery deposit which may result when the molten or liquid thermoplastic hardens.

As a specific illustration, it was found that in using a particular polystyrene resin the gap 30 accomplished the purposes of this invention if its depth were within a range of about 0.0005 to about 0.002 of an inch and its width were approximately .030 of an inch. A gap 30 within this range was also found to be satisfactory for other types of plastics of which samples were run, i.e., polystyrene (acrylonitrile copolymer, polyethylene and polypropylene). The gap size depends on the polymer used, and particularly, its viscosity. Thus gap 30 can be larger for more viscous resins than for those more fluid. Of course, in any case, the gap must be of sufficient depth to permit flash to flake into the reservoir 27.

With the gap 30 within these ranges for this particular resin, it is found that the thermoplastic is prevented from flowing through it, and that the powdery deposit encountered in the past is deposited in the reservoir 27 and not on a mating or abutting seal face. Furthermore, it is found that the powdery deposit can now be removed by simply blowing it out of the reservoir 27. It need not be wiped off. Therefore, whatever cleaning is necessary can be done when the molding apparatus is opened during each cycle of molding operation.

The lip of the molded article has no flashing firmly attached to it, but occasionally a few flakes of plastic may be left on it. These flakes, however, are loose and can be easily wiped or blown off.

The gap 30 is maintained by applying the proper pressure in the pressure gap 24, to force the ring members 21 and 22 apart. This action, in turn, forces the thrust surface 28 on the ring member 21 in engagement with the stationary seal ring 26. In the above-mentioned patent application, a seal face pressure of approximately 1200 p.s.i. is provided in order to eliminate flashing. With the seal of the present invention, the only area of the seal face in which pressure is important is at the gap 30. The unit pressure at this point must be high enough to resist unseating of the seal so as to increase the depth of the gap. It is found that a pressure behind the rotating ring 21 (within pressure gap 24) of 100 p.s.i. or greater will provide a pressure of approximately 2800 p.s.i. at the gap 30, and will virtually eliminate any flashing. This pressure is not between two metal surfaces rubbing together but is only a pressure applied by the plastic as it is trying to flow across the gap 30. As a result, the materials used for the seal rings 21, 22 and 26 do not have to be antifriction bearing material but can be any material capable of withstanding a compression of 2800 p.s.i. without brinelling.

The seal or thrust face 28 of the seal ring 21 must rotate against the stationary seal ring 26 and must therefore be able to resist the force exerted by the pressure within the pressure gap 24 to maintain the gap 30. However, since the thrust face 28 is not exposed to molten plastic, the unit pressure between the mating faces is not important, as it is in the case of the seal of the above-mentioned patent application. The area of the thrust face 28 can be made large so low unit pressures can exist between the mating faces. This means that many low cost bearing materials can be used and with low unit pressures, wear becomes insignificant. The thrust face can even be a roller thrust bearing, if desired.

In an experimental seal, the seal rings 21 and 22 were fabricated of Ampcoloy 668 bronze and the stationary seal ring 26 was fabricated of hardened tool steel or carbide. Three thin grooves, approximately .0005″ deep and ¼″ wide were cut across the thrust face 28 to allow air trapped in the mold cavity 11 to escape. This seal was run for several thousand cycles. After each cycle, during the opening and closing of the mold, both the seal faces (on the stationary seal ring 26 and the rotating seal ring 21) were automatically blown off. The seal was never wiped nor did it require any maintenance. Also, there was no detectable change in the depth of the gap 30 hence indicating there was no wear on the thrust face 28.

It might be specifically noted that the rotating seal ring 21 overhangs the mold cavity to a slight extent at 33. This overhang functions to strip the molded article from the mandrel 10 by forward movement of seal ring 21. An insufficient overhang may cause shearing of the lip of the molded article especially when molding softer polymers such as polypropylene. Therefore, an undesirable wide overhang may be necessary.

In FIG. 2 there is illustrated a preferred mechanical seal structure in which the stripper means is separated from the seal, to eliminate the above described problems.

The elements of the seal structure of FIG. 2 are essentially the same as the seal structure of FIG. 1, and have been so designated by the use of similar part numbers. The difference is that ring member 22 has as an integral part thereof a cylindrical extension stripper means 40 between mandrel 10 and seal ring 21. This enables removal of the molded article by the simple expedient of moving the stripper means forward (to the left in the drawing) after the mold is opened. The ends of the stripper means 40 and the seal ring 21 are aligned when the seal surface 28 abuts the stationary seal ring 26 so as to provide the gap 30.

To provide for such cylindrical extension stripper means, the inside diameter of seal ring 21 is increased to coincide approximately with the outside diameter of the outer element of the mold cavity. The said extension stripper means 40 provides the backup to form the lip 62 of the molded article so that the injected thermoplastic acts upon it instead of the rotary seal ring 21.

As shown rotary seal rings 21 and 22 having the cylindrical extension stripper means 40 as a part thereof, and mandrel 10 rotates as a single member. Thus, the joints between these elements, relative to each other remain stationary. It is therefore not difficult to prevent flash because tolerances may be kept to a minimum since rotary movement between the elements is not involved.

FIG. 3 illustrates a third embodiment of seal. It uses a compression element 60, which may be a Belleville spring or a rubber compression ring or a series of springs about the periphery of the seal rings or other pressure exerting means in place of or in addition to the fluid pressure of the seal structures of FIGS. 1 and 2. This compression element 60 provides for elimination or use of a reduced fluid pressure. For production purposes, it is preferred that only a compression element of proper force be used.

In FIG. 4 there is shown an alternative construction wherein the gap 30 is a controlled gap. That is, the gap 30 is maintained or established by applying the proper pressure through the pressure gap 24 to position the ring member 21 in spaced relation to the stationary member 26. It will be appreciated that this is far more difficult to do, hence the above described manner of establishing the gap 30 is preferred.

In each of the above described constructions, when the molten plastic is injected into the mold, its flow is stopped when it reaches the gap 30, due to decreasing temperature and increasing viscosity of the plastic. A slight amount of the plastic is pushed into the gap 30 and this is ground up. However, since there is no pressure exerted on this plastic by the mechanical seal, this plastic flakes off and falls into the reservoir 27 as a loose deposit. It is not forced into the seal faces. When the mold is opened, this deposit is easily blown out of the reservoir 27. As indicated above, the lip of the molding has no flashing firmly affixed to it, but occasionally a few loose flakes of plastic may be on the lip. These flakes, however, can be easily wiped or blown off.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. In a molding apparatus having an outer mold element and an inner mating mold element which together define a mold cavity and one of which is rotated or oscillated during the molding cycle, the combination of a mechanical seal comprising a first sealing ring fixedly secured to said outer mold element and exposed at the parting line of said molding apparatus; a seal member including a second sealing ring and an abutment ring about said inner mold element, said second sealing ring having an annular reservoir therein and adapted to form a seal face with said first sealing ring when said molding apparatus is closed; and means for providing a gap leading from said mold cavity into said reservoir which is of a size to prevent material within said mold cavity from flowing into said reservoir.

2. The mechanical seal of claim 1 wherein said gap has a depth within a range of about 0.0005 to about 0.002 of an inch.

3. The mechanical seal of claim 2 wherein said gap further has a width which is approximately ⅟₃₂ of an inch.

4. The mechanical seal of claim 1 having, in addition, a source of air whereby said annular reservoir may be blown clean during each molding cycle by said source of air.

5. The mechanical seal of claim 1 wherein said means for providing said gap comprises a seal surface on said second seal ring which is adapted to abut against said first sealing ring.

6. The mechanical seal of claim 1 wherein said means for providing said gap comprises means for forcing said second seal ring in a controlled spaced relation with said first seal ring when said mold is closed.

7. A mechanical seal as claimed in claim 1 wherein a portion of the surface of said second sealing ring overhangs said first sealing ring and forms a stripper means for removing molded objects from said inner mold element when the molding apparatus is opened.

8. A mechanical seal, as claimed in claim 6, wherein said means for forcing said second sealing ring into engagement with said first sealing ring comprises fluid pressure which is injected between said second sealing ring and said abutment ring.

9. A mechanical seal, as claimed in claim 6, wherein said means for forcing said second sealing ring into engagement with said first sealing ring comprises a resilient means forcibly urged between said second sealing ring and said abutment ring.

10. In injection molding apparatus having an outer mold element and an inner mating mold element which together define a mold cavity, said inner mating mold element being adapted to be rotated or oscillated during the molding cycle, and a source of air, the combination of a mechanical seal comprising a first stationary sealing ring fixedly secured to said outer mold element and exposed at the parting line of said molding apparatus; a rotatable seal member including a second and a third sealing ring about said inner mold element, said second sealing ring having a thrust surface engageable with said first sealing ring when said molding apparatus is closed, an annular orifice and a gap leading from said mold cavity into said orifice; and means for forcing said thrust surface on said second sealing ring into engagement with said first sealing ring when said molding apparatus is closed to maintain said gap at a predetermined depth whereby flashing is prevented and any resulting powdery deposit of plastic is deposited in said orifice.

11. A mechanical seal as claimed in claim 10 wherein said third sealing ring has a cylindrical extension thereof about said inner mold element and has the edge of said extension exposed at the parting line of said mold, said exposed edge forming a part of said mold cavity and functioning to strip molded objects from said inner mold element, said second sealing ring extending about said cylindrical extension of said third sealing ring.

References Cited
UNITED STATES PATENTS 2,759,583   8/1956   Ward _____ 277—96 X
3,273,682   10/1966  Schultz _____ 277—96 X SAMUEL ROTHBERG, *Primary Examiner.*